May 15, 1951 W. N. DEAN ET AL 2,552,527
AUTOMATIC GAIN-CONTROL SYSTEM FOR
RADAR DIRECTION INDICATORS
Filed March 28, 1945 2 Sheets-Sheet 1
Fig. 1
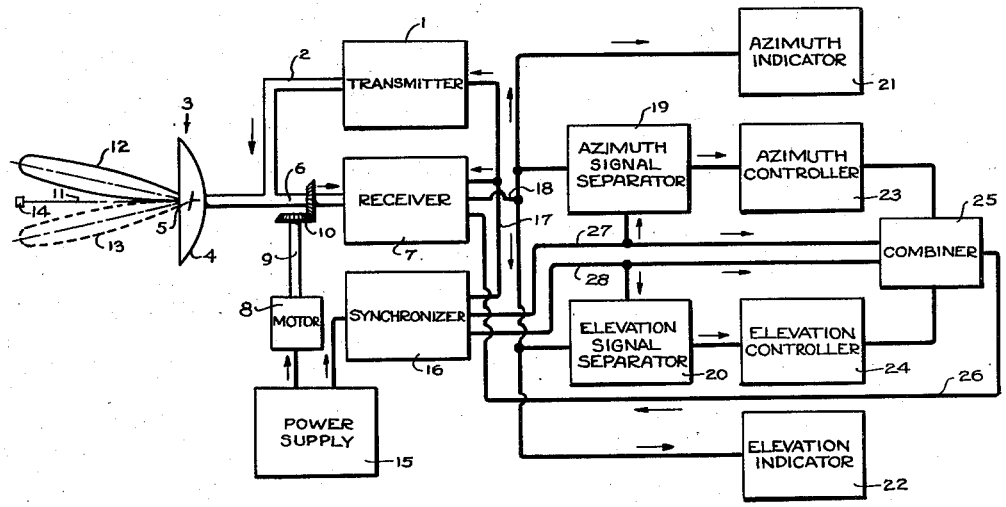
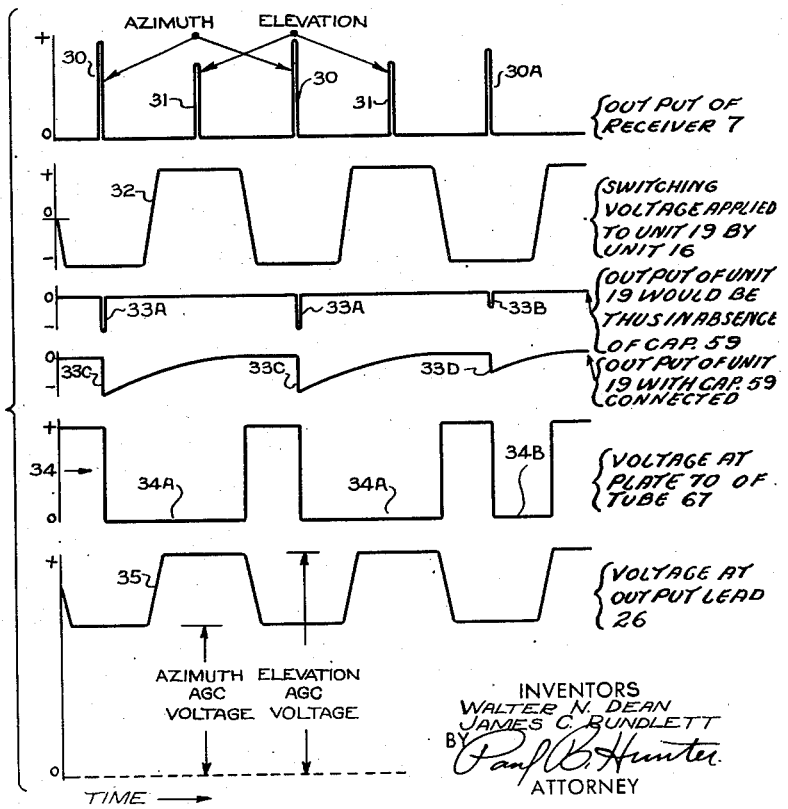
Fig. 2
INVENTORS
WALTER N. DEAN
JAMES C. RUNDLETT
BY
Paul B. Hunter
ATTORNEY

UNITED STATES PATENT OFFICE 2,552,527

AUTOMATIC GAIN-CONTROL SYSTEM FOR RADAR DIRECTION INDICATORS

Walter N. Dean, Washington, D. C., and James C. Rundlett, Flushing, N. Y., assignors to The Sperry Corporation, a corporation of Delaware Application March 28, 1945, Serial No. 585,304

14 Claims. (Cl. 343—16)

This invention relates to automatic gain-control systems, and more particularly to such systems especially adapted for use in pulse receivers of the type employed in radio detecting and ranging or "radar" systems. Such radar systems are adapted for locating and determining the range of objects or targets, and for the following or "tracking" of moving objects or targets. Henceforth in this specification, the expression "AGC system" will be used to denote an automatic gain-control system.

In the conventional radar system adapted for determining the location and range of an object or target, it is customary to employ a highly directional antenna to radiate pulses of extremely short duration from a transmitter. When the antenna is pointed directly at the object, the pulse signals are reflected from the object and may be picked up by a suitable receiver. The direction of the object from the point of observation may readily be determined by the orientation of the directional antenna, and its range may be determined by measuring the elapsed time between the transmission of a signal pulse and its reception. The receiver is, of course, rendered inoperative during the transmission of each signal pulse. If desired, it may be maintained inoperative for all except a chosen portion of the time interval between the transmission of successive signal pulses. This is referred to as "gating" the receiver and is conveniently employed when it is desired to limit the observations to targets within predetermined range limits.

In order that the radar system may follow or track a rapidly moving target or object once the latter has been brought under observation, means are provided which supply information regarding the direction in which the target has moved from the position it occupied when originally observed. One method of accomplishing this is to employ conical scanning, in which a highly directional beam of high-frequency energy is caused to rotate about a principal axis in such a manner that, in a normal plane remote from the radiating system, the midpoint of the beam traces a circle whose center lies on the principal axis. In practice, this is done by rotating a dipole which is slightly offset from the focal point of a relatively fixed paraboloid whose axis coincides with the principal axis. Thus the polarization of the radiated energy changes cyclically during the conical scanning.

Pulse signals are applied to the dipole synchronously with its rotation, so that pulses are transmitted at uniform intervals as the conical scanning goes through each cycle. By comparing the relative strengths of the reflected signals due to pulses occurring at half-scanning-cycle intervals, it is possible to determine the displacement of the target or object under observation from the principal axis. For example, let it be assumed that the principal axis makes an acute angle with the horizontal and has a given bearing in azimuth. Four pulses are radiated during each conical scan of the beam, they are equally spaced, and the first one occurs when the beam forms a maximum angle with the horizontal. A comparison of the relative strengths of the reflected signals due to the first and third pulses will indicate the deviation in elevation of the object from the principal axis, and similarly the second and fourth pulses provide information regarding its deviation in azimuth. For convenience, the first-mentioned group of pulses will be referred to hereinafter as the "elevation pulses" and the second group as the "azimuth pulses." Since the conical scanning is assumed to be accomplished by rotation of a dipole, the former group may be considered as being vertically polarized and the latter group as having horizontal polarization.

Due to the wide range of signal strengths to which the receiver in any radar system is subject, it is highly desirable that it be provided with a suitable AGC system. In radar systems of the type herein contemplated, it has been found that transmitted pulses of the same strength will often result in reflected received elevation and azimuth signal pulse of substantially different intensities. This variation in received signal intensities is due to differences in both propagation and reflection of the radiated signals with changes in their polarization, and has been found to be especially troublesome in the case of rapidly moving targets. For this reason, the ordinary single AGC system is unsatisfactory for use in such radar systems.

Accordingly, it is an object of the present invention to provide an improved AGC system especially adapted for use in pulse receivers, as for example those employed in radar systems of the type capable of following or tracking a moving target.

It is another object of the invention to provide an AGC system having a plurality of channels adapted to be used with a receiver intended for the reception of plural groups of signals of substantially different intensities.

It is still another object of the invention to provide plural means for automatically regulating the gain of a signal receiver sequentially in timed relation to the received signals.

It is an additional object of the invention to provide means whereby a first group of signals may control the sensitivity of a receiver therefor independently of a similar control exerted by a second group of signals displaced in time from the first group.

The invention in another of its aspects relates to novel features of the instrumentalities described herein for achieving the principal objects of the invention and to novel principles employed in those instrumentalities, whether or not these features and principles are used for the principal objects or in the same field.

In accordance with the present invention, it is proposed to provide, in a signal receiver including means for successively receiving a plurality of signal groups displaced in time, a common amplifier for these signals, and separate means for varying the gain of the amplifier inversely in accordance with the average intensity of each of the groups of signals. More specifically, the invention contemplates a radar system in which a single receiver is controlled in succession by a plurality of separate control systems, the control systems being in turn rendered operative and inoperative in timed relation to the radiation of a series of pulses, whose reflections from the target the receiver is adapted to pick up.

The above and other objects and features of the invention will be better understood by reference to the following detailed description taken in connection with the accompanying drawings, in which like components are designated by like reference numerals and in which:

Fig. 1 is a schematic diagram, in block form, of a radar system incorporating the AGC system of the present invention;

Fig. 2 illustrates, in graphical form with a common time base, the operation of the AGC system of Fig. 1.

Figure 3:
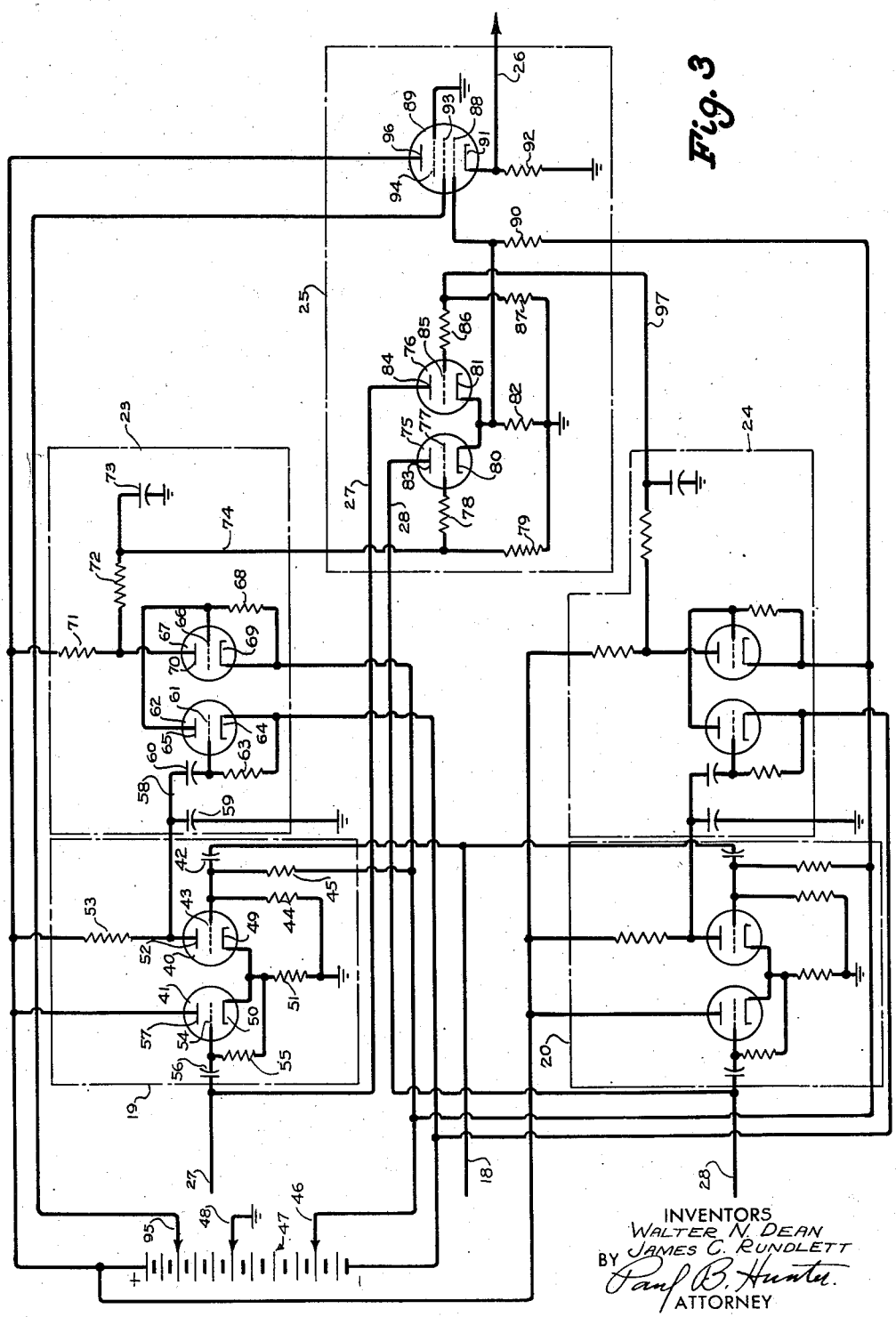
Fig. 3 is a circuit diagram of the AGC system of Fig. 1.

Referring to Fig. 1 of the drawings, there is shown a transmitter 1 which is connected by means of transmission line 2 to an antenna 3. Antenna 3 comprises paraboloid 4 and a rotatable dipole 5. Antenna 3 is also connected by means of transmission line 6 to a receiver 7. A motor 8, through shaft 9 and gear train 10, is arranged to rotate dipole 5 about principal axis 11. Dipole 5 is so mounted with respect to axis 11, as for example with a slight radial displacement, that the uppermost position of its radiation pattern may be represented by solid line 12. When dipole 5 has rotated through 180°, its radiation pattern will be as shown by broken line 13. The object or target under observation is designated 14.

Motor 8, which is of the synchronous type, is supplied with power by power supply 15, which also supplies a synchronizing voltage to synchronizer 16. An output of synchronizer 16 is supplied by means of line 17 to transmitter 1 and to receiver 7.

The output of receiver 7 appearing in line 18 is supplied to azimuth signal separator 19 and to elevation signal separator 20, as well as to azimuth indicator 21 and elevation indicator 22. Azimuth controller 23 and elevation controller 24 are connected respectively to the outputs of separators 19 and 20.

The outputs of azimuth controller 23 and elevation controller 24 are supplied to combiner 25, the output of which in turn is supplied, by means of line 26, to receiver 7. A second output of synchronizer 16 is supplied, by means of line 27, to azimuth signal separator 19 and combiner 25. Line 28 carries a third output from synchronizer 16 to elevation signal separator 20 and combiner 25.

The operation of the radar system of Fig. 1 will be better understood if certain specific operating conditions are assumed by way of example, and by reference to Fig. 2 of the drawings. Accordingly, let it be assumed that power supply 15 provides alternating current having a frequency of 400 cycles per second. Motor 8 operates at a synchronous speed such that, taking into consideration the ratio of gear train 10, dipole 5 rotates at a speed of 100 revolutions per second. Transmitter 1 operates at any suitable carrier frequency, as for example 2800 megacycles per second, and produces a series of extremely short pulses which have a periodicity of 400 cycles per second due to the connection between synchronizer 16 and transmitter 1.

The pulses produced by transmitter 1 are so phased with respect to the rotation of dipole 5 that two of them occur when dipole 5 is vertically disposed and the other two when it is horizontally disposed. The first group of pulses occur when the radiation pattern has a maximum deviation above and below the principal axis 11, and the second group when the lateral deviation is maximum. The pulses occurring when dipole 5 is vertical provide sensing information in elevation, and the pulses occurring when the radiation pattern has its extreme horizontal deviations provide similar information in azimuth.

The pulse signals as reflected from object 14 are picked up by receiver 7 which, by virtue of its connection to synchronizer 16, is rendered inoperative during the intervals in which transmitter 1 is producing the pulses. If desired, receiver 7 may also be provided with a "gating" circuit for the purpose of rendering it non-responsive to the reflected signals coming from an object or target unless the latter is located within a predetermined range from the observation position.

The output of the receiver 7 comprises a series of short positive pulses having a periodicity of 400 cycles per second and consisting alternately of azimuth and elevation pulses. These pulses are shown at 30, 30A and 31 in Fig. 2. For the purpose of separating the azimuth and elevation reflected signals, azimuth and elevation signal separators 19 and 20 are provided. These separators are supplied respectively with separate 200-cycle square-wave switching voltages from synchronizer 16 by means of lines 27 and 28, these switching voltages being in phase opposition. The switching voltage applied to azimuth separator 19 is shown by trace 32 in Fig. 2. During an interval when an azimuth reflected signal is being received, azimuth signal separator 19 is rendered operative by virtue of the applied switching voltage, so that the azimuth reflected signal is passed on to azimuth controller 23 as a series of relatively narrow negative pulses. Likewise, if the incoming reflected signal is one providing elevation information, elevation signal separator 20 is made operative and passes the signal along to elevation controller 24. In each instance, the other channel remains inoperative.

Azimuth indicator 21 and elevation indicator 22 are for the purpose of comparing the heights of successive reflected pulses of each group, so that the operator may determine in which direction, and approximately to what extent, object or target 14 is displaced from principal axis 11. The details of indicator 21 and 22 do not constitute a part of the present invention.

Azimuth controller 23 and elevation controller 24 comprise means for converting a series of relatively short pulses into a useful control voltage which is proportional in magnitude to the average height of the pulses. For example, trace 34 of Fig. 2 illustrates the relatively narrow negative pulses 33A, 33B supplied to azimuth controller 23 after they are converted into relatively long negative pulses which are available for control purposes. Since the duration of each of these pulses exceeds the interval of continuous operation of the azimuth control system, they may be integrated to provide a direct output voltage which remains substantially constant during each such interval.

The respective direct output voltages thus developed by controllers 23 and 24 are supplied to combiner 25 which is also furnished with square-wave switching voltages from synchronizer 16 over lines 27 and 28. The purpose of combiner 25 is to produce a single AGC voltage for application, by means of line 26, to receiver 7. During the time interval in which azimuth signals are received, this single control voltage, which is represented by trace 35 in Fig. 2, has a magnitude dependent upon the output of azimuth controller 23. Likewise, when elevation signals are being received, the magnitude of the control voltage depends solely upon the output of elevation controller 24.

It will be noted, from the above description of the operation of the radar system of Fig. 1, that a single receiver is successively subjected to gain control in accordance with the signal strengths or intensities of two different groups of incoming signals. Let it be assumed that, as illustrated in Fig. 2, the azimuth signals are substantially stronger than the elevation signals. In this case, azimuth controller 23 will develop an appreciably smaller output voltage than will elevation controller 24 and, due to the action of combiner 25, the smaller output voltage will be applied to reduce the control voltage applied to, and the gain of, receiver 7 during the reception of the stronger azimuth signals, thereby preventing any possible saturation of the receiver by these strong signals. On the other hand, there is no possibility that the weaker elevation signals will be masked or lost due to low sensitivity of receiver 7 since, when the receiver is handling the weaker elevation signals, its gain has been restored to the necessary extent by the action of elevation controller 24 in cooperation with combiner 25.

It will be understood that the present invention is not specific to any particular method of or means for varying the gain of receiver 7. It has been found in practice, however, that controlling the screen-grid and/or the plate voltages of one or more of the vacuum tubes in the receiver is somewhat more satisfactory, at the necessarily high carrier and intermediate frequencies involved in radar systems, than varying the control-grid voltages of such tubes in accordance with the general practice in radio receivers in the past. Hence the control voltage is shown as positive in Fig. 2. It is, of course, necessary that the control voltage supplied from combiner 25 vary in the correct sense with changes in the signal strength so that the gain of receiver 7 is reduced during the reception of strong signals and increased during the reception of weak signals. It is contemplated that any polarity-reversing device which may be necessary to achieve this result may readily be incorporated in combiner 25.

Reference is now made to Fig. 3 of the drawings, which shows in detail the circuit arrangements of the AGC system shown diagrammatically in Fig. 1. This system includes the azimuth and elevation signal separators, the azimuth and elevation controllers, and the combiner. Since the separators and controllers are identical in the azimuth and elevation channels, only the azimuth channel will be described in detail, it being understood that the same explanation applies equally well to the elevation components of the AGC system.

Azimuth signal separator 19 comprises a pair of vacuum tubes 40 and 41, which are preferably triodes and which may, if desired, be combined in a single envelope. Line 18, which carries the output of receiver 7 (Fig. 1), is coupled by means of a capacitor 42 to grid 43 of vacuum tube 40. Grid 43 is also connected to the junction of resistors 44 and 45 which are connected in series between ground and a negative tap 46 on a potential source 47, which has a grounded intermediate tap as shown at 48. Cathodes 49 and 50, respectively of vacuum tubes 40 and 41, are connected together and to ground through resistor 51. Plate 52 of vacuum tube 40 is connected through resistor 53 to the positive terminal of source 47. Grid 54 of vacuum tube 41 is connected to cathode 50 by means of resistor 55, and is coupled by means of capacitor 56 to line 27, which supplies a square-wave voltage from synchronizer 16 (Fig. 1). Plate 57 of vacuum tube 41 is connected directly to the positive terminal of source 47.

In operation, vacuum tube 40 normally operates close to its plate-current cutoff point due to the voltage developed by vacuum tube 41 across common cathode resistor 51, so that it is responsive to positive signal pulses supplied by line 18 through capacitor 42. Such pulses are amplified by vacuum tube 40 and appear as large negative pulses at plate 52. Vacuum tube 41 operates to render vacuum tube 40 inoperative whenever a positive voltage is applied to grid 54 of vacuum tube 41 from line 27 by means of capacitor 56. Such a positive voltage causes vacuum tube 41 to become increasingly conductive, so that the voltage drop across common cathode resistor 51 increases to such an extent that vacuum tube 40 is rendered completely inoperative. During negative swings of the square-wave voltage in line 27, the plate current of vacuum tube 41 decreases to such an extent that vacuum tube 40 is restored to its normal condition of operation.

The output voltage from signal separator 19 is supplied to azimuth controller 23 by means of a connection 58 from plate 52 of vacuum tube 40. Connection 58 is by-passed to ground by a capacitor 59, and is coupled by a capacitor 60 to the grid 61 of a vacuum tube 62. Grid 61 is also connected, by means of resistor 63, to cathode 64 of vacuum tube 62, and the cathode in turn is connected to the negative terminal of potential source 47. Plate 65 of vacuum tube 62 is connected to the grid 66 of a vacuum tube 67. Grid 66 is also connected by means of resistor 68 to cathode 69 which is connected to negative tap 46 on potential source 47. Plate 70 of vacuum tube 67 is connected through resistor 71 to the positive terminal of source 47, and through resistor 72 and capacitor 73 in series to ground. Output line 74 is connected to the junction of resistor 72 and capacitor 73. Vacuum tubes 62 and 67 are preferably of the type having a sharp cutoff characteristic and may, if desired, be enclosed in a single envelope.

Assuming for the moment that no signal pulses are present in line 58, vacuum tube 62 has substantially zero grid bias and hence draws appreciable plate current, which flows through resistor 68. The resultant voltage drop across resistor 68 serves to bias vacuum tube 67 beyond cutoff, so that the potential at plate 70 substantially equals that of the positive terminal of source 47.

If capacitor 59 were not present, the azimuth signal output appearing in line 58 would comprise a series of relatively narrow negative pulses of substantially uniform amplitude (such as shown at 33A in Fig. 2). By the action of capacitor 59 in cooperation with resistor 53, however, these pulses are elongated and thus take the form shown at 33C in Fig. 2. It will be noted that pulses 33C are also of substantially uniform amplitude.

If a received signal pulse, such as the azimuth pulse illustrated at 30A in Fig. 2, is weaker than the preceding ones, the corresponding negative pulse 33B at the output of the receiver would have a smaller amplitude than the pulses 33A (again assuming capacitor 59 to be temporarily disconnected). As a result, the integrated pulse 33D has a lower maximum value than that of pulses 33C. The integrated pulses drive grid 61 of vacuum tube 62 beyond cutoff, so that no appreciable plate current flows through resistor 68. Thus vacuum tube 67 becomes highly conductive, and the voltage at plate 70 approaches zero, since cathode 69 is returned to negative tap 46. The length of time that plate 70 remains at substantially zero potential depends upon how long vacuum tube 62 is cut off, and this in turn is a function of the magnitude of the negative signal pulses which appear at plate 52 of vacuum tube 40.

Thus a rectangular wave of constant magnitude but comprising pulses of variable width, is developed at plate 70 of vacuum tube 67. (This wave is shown at 34 in Fig. 2.) The width of the pulses comprising wave 34 is a function of the magnitude of the azimuth signal pulses at plate 52 of vacuum tube 40. Relatively wide portions 34A of wave 34, for example, correspond with pulses 33C; and the resultant of smaller pulse 33B is shown by the narrower portion 34B. Wave 34 is integrated by the action of resistor 72 and capacitor 73, so that a positive unidirectional voltage, whose magnitude is dependent upon the magnitude of the received azimuth pulses, appears at line 74. The time constant of the filter 72—73 is carefully chosen to be long enough to prevent change in the control voltage for each individual pulse, but short enough to insure proper compensation for relatively rapid changes in the received signal strength. For this reason, the difference in width of portion 34B of wave 34 compared with that of portions 34A has no immediate effect upon the amplitude of the azimuth portion of the control voltage represented in Fig. 2 by trace 35.

Combiner 25 comprises a pair of vacuum tubes 75 and 76 which are preferably triodes and which may be enclosed in a single envelope. Grid 77 of vacuum tube 75 is connected to ground through resistors 78 and 79 in series, to the junction of which is connected line 74 from azimuth controller 23. Cathodes 80 and 81, respectively of vacuum tubes 75 and 76, are connected together and to ground through resistor 82. Plates 83 and 84, respectively of vacuum tubes 75 and 76, are connected respectively to lines 28 and 27, which carry square-wave voltages supplied by synchronizer 16 (Fig. 1). Grid 85 of vacuum tube 76 is connected to ground through resistors 86 and 87 in series, to the junction of which is connected line 97, which carries the output from elevation controller 24.

Cathodes 80 and 81 are connected to control-grid 88 of vacuum tube 89, and the control-grid is also connected by means of resistor 90 to negative tap 46 on potential source 47. Cathode 91 of vacuum tube 89 is grounded through resistor 92 and is also connected to line 26, over which the gain-control voltage is supplied to receiver 7 (Fig. 1). Screen-grid 93 and suppressor-grid 94 of vacuum tube 89 are connected respectively to positive tap 95 on potential source 47 and to ground. Plate 96 of vacuum tube 89 is connected to the positive terminal of source 47.

In operation, vacuum tubes 75 and 76 operate as cathode followers, and are rendered alternately operative and inoperative, due to the square-wave voltages of opposite phase which are applied to their plates by lines 28 and 27, to switch respectively the direct-current voltages applied to their grids by means of lines 74 and 97. The purpose of resistors 78 and 86 is to prevent a discharge of the integrating capacitors from occurring through vacuum tubes 75 and 76 during the interval in which they are respectively inoperative.

The resultant direct-current output voltage which is developed across common cathode resistor 82 is supplied to vacuum tube 89 which functions as a cathode follower to convert the voltage applied to its control-grid 88 into a useful form of power across its cathode resistor 92. As a result, a positive unidirectional voltage 35 (Fig. 2) is developed in line 26 having a magnitude which depends alternately upon the strength of the signal pulses applied to the azimuth channel and to the elevation channel of the AGC system. This voltage is suitable for application to the screen-grids and/or plates of one or more vacuum tubes of receiver 7 (Fig. 1).

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radio detecting and ranging system for locating an object, transmitting means for producing and radiating periodic signal waves having a plurality of polarizations, receiving means for receiving said signal waves as reflected from said object, means for utilizing said received signal waves, plural means for controlling the gain of said receiving means selectively and sequentially in inverse accordance with the intensities of sequential ones of said received signal waves, and means for synchronizing said controlling means with said transmitting means whereby the one of said controlling means controlling said gain at any moment corresponds to the polarization of the transmitted signal waves.

2. In a radio detecting and ranging system for locating an object, transmitting means for producing and radiating a first pair of horizontally polarized signal waves and a second pair of vertically polarized signal waves, said signal waves being alternately displaced in time, receiving means for receiving said first and second pairs of signal waves as reflected from said object, means for utilizing said received signal waves, and separate means for controlling the gain of said receiving means in inverse accordance with the intensity of said received signal waves corresponding respectively to said first and second pairs of signal waves.

3. In a signaling system, a receiver having input and output terminals, an antenna connected to said input terminals and adapted to pick up a plurality of signals displaced in time, first selector means connected to said output terminals for passing alternate received signals and rejecting the others, second selector means connected to said output terminals for passing the signals rejected by said first selector means and rejecting the signals passed thereby, first and second means for developing respective control voltages corresponding in magnitude to the average intensities of each of the groups of alternate signals, and means for applying said control voltages alternately to said receiver for regulating its gain during the reception of signals of the corresponding signal group.

4. In a signaling system, a receiver having input and output terminals, a rotating antenna connected to said input terminals and adapted to pick up a plurality of signals displaced in time and in polarization, means connected to said output terminals and synchronized with the rotation of said antenna to separate the received signals into groups according to their polarization, separate means for developing a control voltage corresponding in magnitude to the average intensity of each of said signal groups, and means synchronized with the rotation of said antenna for applying said control voltages selectively to said receiver for regulating its gain during the reception of the corresponding signal group.

5. Apparatus for converting a series of narrow pulses of variable magnitude but of fixed width into a series of relatively wide pulses of fixed magnitude but of width dependent on the magnitude of said narrow pulses, comprising in combination, integrating means for elongating said narrow pulses, a variable delay circuit responsive to the output of said integrating means and adapted to provide output pulses of fixed magnitude but of width dependent upon the magnitude of said narrow pulses, and means for utilizing the pulsed output of said variable delay circuit.

6. Apparatus for converting a series of narrow pulses of variable magnitude but of fixed width into a series of relatively wide pulses of fixed magnitude but of width dependent upon the magnitude of said narrow pulses, comprising in combination, integrating means for elongating said narrow pulses, a variable delay circuit responsive to the output of said integrating means and adapted to provide output pulses of fixed magnitude but of width dependent upon the magnitude of said narrow pulses, said variable delay circuit comprising at least one vacuum tube having a sharp cutoff characteristic, and means for utilizing the pulsed output of said variable delay circuit.

7. Apparatus for converting a series of narrow pulses of variable magnitude into a direct voltage having a magnitude dependent upon the average magnitude of said narrow pulses, comprising in combination, means for elongating said narrow pulses, relay means operatively coupled to said elongating means and adapted to provide output pulses of fixed magnitude but of width dependent upon the magnitude of said narrow pulses, and integrating means operatively coupled to said relay means for averaging said output pulses to provide a direct voltage having a magnitude which is a function of the width of said output pulses.

8. Apparatus for converting a series of narrow pulses of variable magnitude into a direct voltage having a magnitude dependent upon the average magnitude of said narrow pulses, comprising in combination, means for elongating said narrow pulses, relay means operatively coupled to said elongating means and adapted to provide output pulses of fixed magnitude but of width dependent upon the magnitude of said narrow pulses, said relay means comprising at least one vacuum tube having a sharp cutoff characteristic, and integrating means operatively coupled to said relay means for averaging said output pulses to provide a direct voltage having a magnitude which is a function of the width of said output pulses.

9. Apparatus for converting a series of narrow pulses of variable magnitude but of fixed width into a series of relatively wide pulses of fixed magnitude but of width dependent upon the magnitude of said narrow pulses, comprising in combination, an integrator for elongating said narrow pulses, first and second vacuum tubes being respectively normally conductive and non-conductive, means for applying said elongated narrow pulses to said first vacuum tube to render it non-conductive for a period of time dependent upon the magnitude of said narrow pulses, means including connections between said first and second vacuum tubes for rendering said second vacuum tube conductive during the period of non-conductivity of said first vacuum tube, and means for utilizing the resultant constant-magnitude pulses developed in the output circuit of said second vacuum tube.

10. Apparatus for converting a series of narrow pulses of variable magnitude but of fixed width into a series of relatively wide pulses of fixed magnitude but of width dependent upon the magnitude of said narrow pulses, comprising in combination, an integrator means for elongating said narrow pulses, first and second vacuum tubes being respectively normally conductive and non-conductive, means for applying said elongated narrow pulses to said first vacuum tube to render it non-conductive for a period of time dependent upon the magnitude of said narrow pulses, at least one of said vacuum tubes having a sharp cutoff characteristic, means including connections between said first and second vacuum tubes for rendering said second vacuum tube conductive during the period of non-conductivity of said first vacuum tube, and means for utilizing the resultant constant-magnitude pulses developed in the output circuit of said second vacuum tube.

11. In a signaling system: means for successively receiving a plurality of signals displaced in time, said signals comprising a series of narrow pulses of variable magnitude; a common amplifier for said signals; separate means responsive to the output of said amplifier due respectively to each of said signals, said separate means each comprising an integrator for elongating said narrow pulses and variable delay means operatively coupled to said integrator and adapted to provide output pulses of fixed magnitude but of width dependent upon the magnitude of said narrow pulses; and means for utilizing the pulsed output of said variable delay means for varying the gain of said amplifier inversely in accordance with the intensity of each of said signals.

12. In a signaling system: means for successively receiving a plurality of signals displaced in time, each of said signals comprising a series of narrow pulses of variable magnitude; a common amplifier for said signals; separate means responsive to the output of said amplifier due respectively to each of said signals, said separate means each comprising means for elongating said narrow pulses, relay means operatively coupled to said elongating means and adapted to provide output pulses of fixed magnitude but of width dependent upon the magnitude of said narrow pulses, and integrating means operatively coupled to said relay means for averaging said output pulses to provide a direct voltage having a magnitude which is a function of the width of said output pulses; and means for utilizing said direct voltage to vary the gain of said amplifier inversely in accordance with the intensity of each of said signals.

13. In a radio detecting and ranging system for locating an object, transmitting means for producing and radiating recurrent signal pulses in cycles of four pulses per cycle, means for directing the pulse energy of the successive pulses of each cycle in successive directions displaced upward, then to one side, downward, and then to the opposite side relative to an axis of aiming, receiving means for receiving said signal waves as reflected from an object, first and second voltage storage circuits, first means for supplying to said first storage circuit a voltage varying according to the average intensity of pulses reflected from the object with said upward and downward directions of aiming, means for supplying to said second storage circuit a voltage varying according to the average intensity of the reflected pulses received with the sidewise aiming directions, and means for controlling the gain of said receiving means alternately in inverse accordance with the intensity of the voltage in said first storage circuit and in inverse accordance with the intensity of the voltage in said second storage circuit.

14. In a signaling system, means for successively receiving a plurality of groups of alternately occurring pulse signals, a common amplifier for said signals, an integrator responsive to the output of said amplifier, a variable delay circuit responsive to the output of said integrator, and means responsive to the output of said variable delay circuit for varying the gain of said amplifier inversely in accordance with the average intensity of the pulse signals of the respective signal groups.

WALTER N. DEAN.
JAMES C. RUNDLETT.

REFERENCES CITED

The following references are of record in the file of this patent:

UNITED STATES PATENTS

| Number | Name | Date |
| --- | --- | --- |
| 2,092,887 | Luck | Sept. 14, 1937 |
| 2,189,549 | Hershberger | Feb. 6, 1940 |
| 2,223,995 | Kotowski et al. | Dec. 3, 1940 |
| 2,227,598 | Lyman et al. | Jan. 7, 1941 |
| 2,266,194 | Guanella | Dec. 16, 1941 |
| 2,280,707 | Kell | Apr. 21, 1942 |
| 2,324,314 | Michel | July 13, 1943 |
| 2,402,916 | Schroeder | June 25, 1946 |
| 2,421,340 | Levy | May 27, 1947 |
| 2,422,069 | Bedford | June 10, 1947 |
| 2,422,334 | Bedford | June 17, 1947 |
| 2,423,082 | Busignies | July 1, 1947 |
| 2,423,644 | Evans | July 8, 1947 |
| 2,433,667 | Hollingsworth | Dec. 30, 1947 |
| 2,445,584 | Ramo | July 20, 1948 |
| 2,449,985 | Gloess | Sept. 28, 1948 |